(12) United States Patent
Ali et al.

(10) Patent No.: US 12,518,408 B2
(45) Date of Patent: Jan. 6, 2026

(54) VIDEO-BASED TRACKING SYSTEMS AND METHODS

(71) Applicant: INVISION AI, INC., Toronto (CA)

(72) Inventors: Karim Ali, Toronto (CA); Julien Vincent Pilet, Renens (CH); Carlos Joaquin Becker, Lausanne (CH)

(73) Assignee: INVISION AI, INC., Toronto (CA)

( * ) Notice: Subject to any disclaimer, the term of this patent is extended or adjusted under 35 U.S.C. 154(b) by 0 days.

(21) Appl. No.: 17/799,604

(22) PCT Filed: Jul. 5, 2021

(86) PCT No.: PCT/CA2021/050913
§ 371 (c)(1),
(2) Date: Aug. 12, 2022

(87) PCT Pub. No.: WO2022/000094
PCT Pub. Date: Jan. 6, 2022

(65) Prior Publication Data
US 2023/0068001 A1    Mar. 2, 2023

Related U.S. Application Data

(60) Provisional application No. 63/048,056, filed on Jul. 3, 2020.

(51) Int. Cl.
*G06T 7/50* (2017.01)
*G06T 7/292* (2017.01)
(Continued)

(52) U.S. Cl.
CPC ............... *G06T 7/50* (2017.01); *G06T 7/292* (2017.01); *G06T 7/579* (2017.01); *G06T 15/00* (2013.01);
(Continued)

(58) Field of Classification Search
CPC . G06T 2207/20081; G06T 2207/10016; G06T 2207/10028; G06T 2207/20084;
(Continued)

(56) References Cited

U.S. PATENT DOCUMENTS 10,535,146 B1    1/2020    Buibas et al.
10,586,102 B2    3/2020    Ren et al.
(Continued)

OTHER PUBLICATIONS

PCT, Written Opinion and International Search Report of International Application No. PCT/CA2021/050913, mailing date Sep. 15, 2021.
(Continued)

*Primary Examiner* — Xiao M Wu
*Assistant Examiner* — Scott E Sonners
(74) *Attorney, Agent, or Firm* — Norton Rose Fulbright Canada LLP

(57) ABSTRACT

A system for video-based tracking of objects in one or more regions of interest. The system includes one or more cameras to capture image streams of the one or more regions of interest, the imaging streams including zero or more objects. A plurality of image processors of the system receive the captured image streams from the one or more cameras, and detect the one or more objects or object parts in the captured image streams and generate geometric and tracking data for detected objects. A fusion processor of the system receives the captured image streams and geometric and tracking data for detected objects from the plurality of image processors, and generates fused 3D referenced data using the detection and tracking data detected objects.

27 Claims, 10 Drawing Sheets

(51) Int. Cl.
  *G06T 7/579* (2017.01)
  *G06T 15/00* (2011.01)
  *G06V 10/25* (2022.01)
  *G06V 20/40* (2022.01)
  *G08G 1/017* (2006.01)

(52) U.S. Cl.
  CPC .............. *G06V 10/25* (2022.01); *G06V 20/41* (2022.01); *G08G 1/0175* (2013.01); *G06T 2200/08* (2013.01); *G06T 2207/10016* (2013.01); *G06T 2207/20084* (2013.01); *G06T 2207/20221* (2013.01); *G06T 2207/30236* (2013.01); *G06T 2207/30241* (2013.01); *G06V 2201/08* (2022.01)

(58) Field of Classification Search
  CPC . G06T 2207/30196; G06T 2207/30232; G06T 7/75; G06T 17/00; G06T 2207/30241; G06T 2207/20076; G06T 2207/30252; G06T 2207/30261; G06T 7/251; G06T 7/292; G06T 7/55; G06T 2210/12; G06T 7/11; G06T 7/12; G06T 7/215; G06T 7/50; G06T 7/564; G06V 10/82; G06V 20/58; G06V 20/52; G06V 10/764; G06V 10/25
  See application file for complete search history.

(56) References Cited

U.S. PATENT DOCUMENTS

| | | | |
|---|---|---|---|
| 10,679,362 | B1 | 6/2020 | Mckennoch |
| 10,839,203 | B1* | 11/2020 | Guigues .............. G06F 18/214 |
| 11,823,461 | B1* | 11/2023 | Song ..................... G01S 13/931 |
| 2015/0294496 | A1 | 10/2015 | Medasani et al. |
| 2019/0079256 | A1* | 3/2019 | Landry ................ G02B 6/4457 |
| 2019/0079526 | A1* | 3/2019 | Vallespi-Gonzalez ...................... G01S 7/4802 |
| 2019/0113927 | A1* | 4/2019 | England ................. G06N 5/046 |
| 2019/0145765 | A1* | 5/2019 | Luo ...................... G06V 10/764 702/153 |
| 2020/0026282 | A1* | 1/2020 | Choe ................... B60W 60/001 |
| 2021/0150230 | A1* | 5/2021 | Smolyanskiy ......... G06V 20/56 |
| 2021/0233326 | A1* | 7/2021 | Li ............................ G06T 7/74 |

OTHER PUBLICATIONS

Canadian Intellectual Property Office, Office Action dated May 31, 2022 for Canadian Patent Application No. 3,156,840.

* cited by examiner

VIDEO-BASED TRACKING SYSTEMS AND METHODS

FIELD

The improvements generally relate to the field of tracking systems, and more specifically to the field of video based tracking systems.

INTRODUCTION

Tracking systems and processes locate a moving object (or multiple objects, or parts of an object) over time using video data from one or more camera. There are numerous applications and use cases for tracking systems. Tracking systems may rely on 2D bounding boxes of objects, which may preclude the video tracking system from determining 3D features of an object in a video frame.

Some approaches include supplementing the 2D bounding boxes with additional information from various non-video sensor types. However, incorporating the additional information into the tracking system may be cost prohibitive, or prove too challenging to effectively synchronize.

Tracking systems for determining 3D features from video data are desirable.

SUMMARY

In accordance with an aspect, there is provided a system for video-based tracking of objects in one or more regions of interest. In some embodiments, the system includes a camera capturing an imaging stream of a region of interest. The imaging stream including zero or more objects for tracking or detection. The system can detect an object or parts of the object in the imaging stream. The system has an imaging processor and a fusion processor. The image processor receives the captured image stream from the camera, and generates a detection data set for the captured image stream. The detection data set has one or more detection data entries of respective imaging stream frame positions for detected objects in the frame of the captured image stream. The fusion processor receives the detection data set, and generates fused 3D referenced data by fitting the detection data entries to a shape and a trajectory of the detected objects.

In accordance with an aspect, there is provided a system for video-based tracking of objects or parts of the objects in one or more regions of interest. The system involves a first image processor to: receive a first captured image stream of one or more regions of interest from a first camera, the image stream depicting zero or more objects for tracking or detection; generate a detection data set for the first captured image stream by applying a neural network and converting the output of the neural network to a 3D shape, the detection data set having one or more detection data entries of respective imaging stream frame positions for detected objects or object parts in each frame of the first captured image stream. The system has a second image processor to: receive a second captured image stream of one or more regions of interest from a second camera, the image stream depicting the zero or more objects; generate, in each frame of the second captured image stream having the detected objects or object parts, one or more additional detection data entries of respective second imaging stream frame positions for the detected objects or object parts. The system has a fusion processor to: receive the detection data entries and the additional detection data entries; generate fused 3D referenced data by fitting the detection data entries and the additional detection data entries to a shape and a trajectory of the detected objects; and transmit the fused 3D referenced data to an application.

In example embodiments, the fusion processor generates the fused 3D referenced data by determining a most likely shape and trajectory among a set of test shapes and test trajectories for detection data entries within a time window, selecting the most likely test trajectory of the set of test shapes and test trajectories as the trajectory, and selecting a most likely test shape of the set of test shapes and test trajectories as the shape.

In example embodiments, the test shapes and the most likely test shape is cuboid. The detected data entries include 6 or more cuboid vertices for each detected object in each frame.

In example embodiments, the test shapes are described by a set of parts, and the detected data entries include a vertex for each detected part in each frame.

In example embodiments, the fusion processor implements fitting using an expected motion or an expected shape of each detected object. In example embodiments, the fusion processor generates the fused 3D referenced data using a time window of the detection data entries and fitting a most likely shape and trajectory among a set of test shapes and test trajectories. Fitting the test trajectories and test shapes may involve comparing the test shape or trajectory to an expected motion or an expected shape of each detected object. Fitting can include the comparison of the detected shape (detected by the image processor) and the test shape.

In example embodiments, the detected data entries include a detected shape. The fitting considers a comparison of the detected shape and the test shape.

In example embodiments, the fusion processor determines the most likely shape and trajectory among the set of test shapes and test trajectories by assigning a lower likelihood to test trajectories and test shapes which represent test trajectories with high acceleration.

In example embodiments, the system includes a second camera capturing a second imaging stream of the region of interest. The imaging streams include zero or more objects. The system has a second image processor in this example. The second image processor receives the second captured image stream from the second camera, and generates, in each frame of the captured second image stream having the detected objects, one or more second imaging stream detection data entries of respective second imaging stream frame positions for the detected objects. The fusion processor is further configured to receive the updated detection data entries, and generate the fused 3D referenced data by fitting the detection data entries and the second imaging stream detection data entries to the shape and the trajectory of the detected objects.

In example embodiments, the system includes a second camera capturing a second imaging stream of the region of interest. The imaging streams including zero or more objects. The system has a second image processor. The second image processor receives the second captured image stream from the second camera, and generates, in each frame of the captured second image stream having the detected objects, one or more second imaging stream detection data entries of respective second imaging stream frame positions for the detected objects. The fusion processor is further configured to receive the updated detection data entries, and generate the fused 3D referenced data by fitting the detection data entries and the second imaging stream detection data entries to the shape and the trajectory of the detected objects.

The trajectory has a first part in the region of interest and a second part in the second region of interest.

In example embodiments, the system further includes an interface to render and display 3D visual overlays generated from the 3D referenced fused data.

In example embodiments, the fusion processor generates mobile radio routing data from the detection data set.

In example embodiments, the fusion processor generates social distancing data by determining distances between the two or more detected objects in the fused 3D referenced data.

In example embodiments, the detected objects are vehicles, and the fusion processor generates traffic control data from the fused 3D referenced data representative of detected vehicle objects.

Many further variations, including combinations of features concerning embodiments described herein are contemplated.

DETAILED DESCRIPTION

Figure 1A:
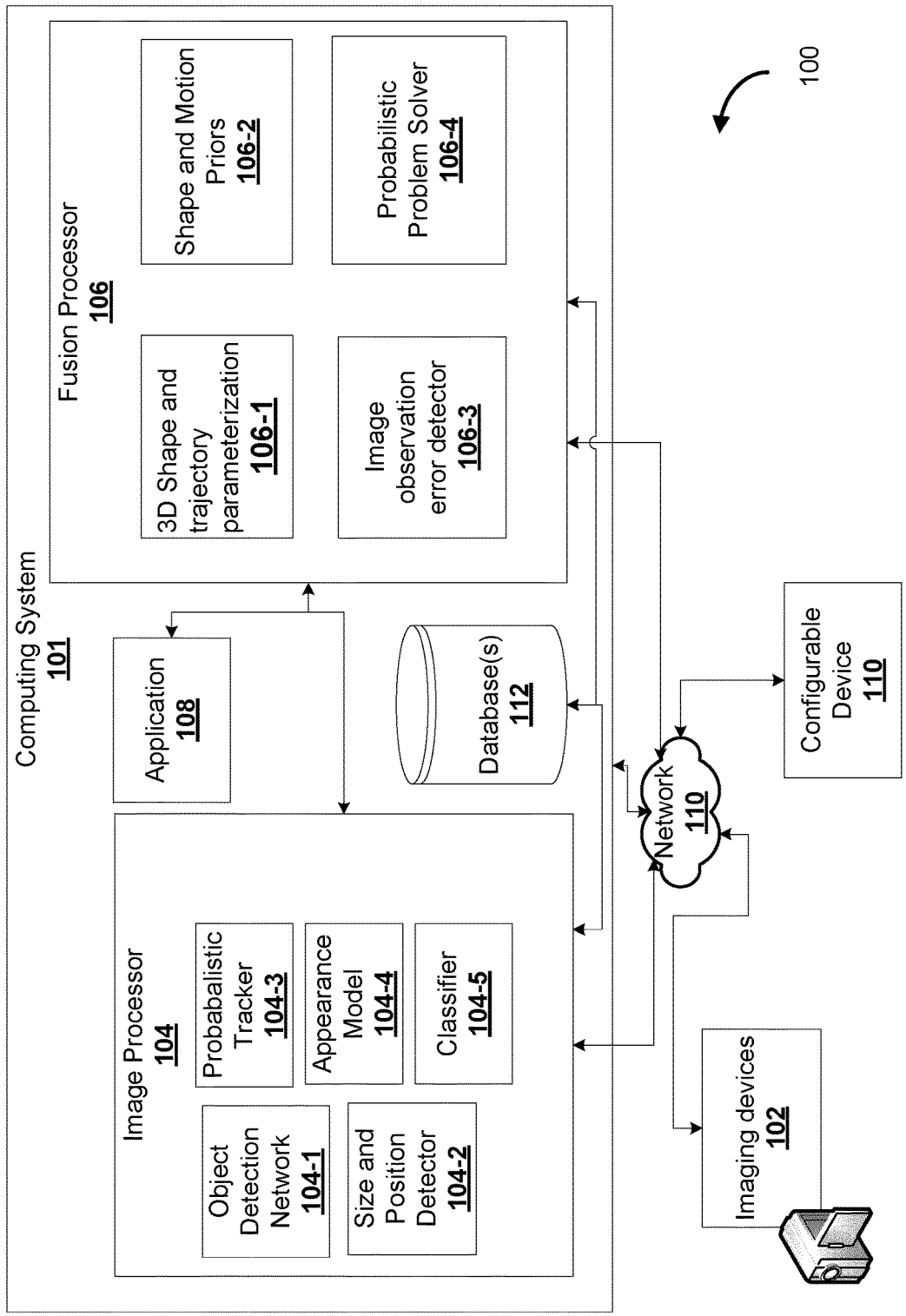
FIG. 1A is a network diagram of a system for video based tracking, in accordance with example embodiments.

In video based tracking systems, object detectors output axis-aligned 2D bounding boxes. However this output does not determine the 3D extent of an object (e.g. a car).

Some video based tracking systems are constrained to a single camera geometry or configuration. This is limiting for applications such as traffic monitoring and smart cities, where different camera models are used. Moreover, the need for a fixed camera model means that training data from other sources cannot be used, requiring more data acquisition and annotation effort. The tracking system can use the geometric model of a camera for data processing.

Technical challenges associated with video based tracking systems also include the difficulty in linking detected objects or detected object parts and the related properties from one frame to the other. To impose temporal consistency constraints and to identify objects as they move around the scene, the tracking system should link detections in multiple frames when they belong to the same object.

A further technical challenge associated with video based tracking systems is that, owing to camera features, or otherwise, several noisy observations of an object can be received from one or more cameras, taken at different times (typically consecutive video frames). Noisy and potentially wrong observations impede object detection and classification, and further erode the reliability and accuracy of modeling of the real objects that caused these observations.

Another technical challenge associated with video based tracking systems is that sampling the object pose explicitly every time it is needed (e.g., typically at every frame for each camera) leads to many unknowns, which significantly slows down the determination of the location and geometry of the detected object. For example, the sampling may slow down fitting based on the Levenberg-Marquardt algorithm as the algorithm has a complexity of approximately $O(N^3)$ with respect to the number of unknowns.

Where the video based tracking system is used to identify shapes, a technical challenge can include accounting for the video based tracking systems propensity to determine or output shape guesses do not necessarily make geometric sense, or that do not make sense in the context of the video data.

Embodiments described herein relate to video based tracking systems and methods, which, via an image processor, generate detection data sets for detected objects or detected object parts within captured image streams of a region of interest from one or more imaging devices. The image processor may generate one or more detection data entries of respective imaging stream frame positions for detected objects or object parts in each frame of the captured image stream. The video based tracking systems and methods further include a fusion processor which processes the received detection data sets and generates fused 3D referenced data by fitting the detection data entries to a shape and a trajectory of the detected objects.

Video based tracking systems and methods can generate the fused 3D referenced data using a time window of the detection data entries and fitting a most likely shape and trajectory among a set of test shapes and test trajectories. Fitting the test trajectories and test shapes may involve comparing the test shape or trajectory to an expected motion or an expected shape of each detected object. Fitting can include the comparison of the detected shape (detected by the image processor) and the test shape.

The systems and methods thereafter can select a most likely test trajectory of the test trajectories as the trajectory a most likely test shape of the test shapes as the shape.

By determining an object position with an image processor, and subsequently determining the trajectory (e.g., the most likely trajectory) and the shape (e.g., the most likely shape), the system may allow for greater operability with various imaging device types. The fusion processor is not trained to determine trajectories or shapes based on imaging device specific calibrated data and can be used with different types of imaging devices.

By generating 3D referenced fused data, the proposed video based tracking systems and methods may be able to determine the extent of an object in 3D from video data. In some embodiments, the system may generate 3D referenced fused data based on determining lines of sight from the camera to the detected object. Moreover, by generating 3D referenced fused data, the proposed video based tracking systems and methods may allow for linking detected objects and the related properties from one frame to the other based on the reference data. This allows the systems and methods to place an object in an objective space.

As used herein, 3D referenced fused data can refer to data which expresses or indicates object shape and trajectory in a reference environment model or coordinate system. For example, the tracking systems and methods may include an initial calibration process to compute a reference environment model or coordinate system. The calibration process can involve determining the imaging device orientation and placement with respect to a GIS.

The video based tracking systems and methods can be used for different applications and use cases. For example, the described system can be used to measure and analyze the flow of people over an area of arbitrary size, including spaces with multiple floors such as shopping malls and airports. The described system can be used to measure flow of vehicles and pedestrians on public spaces, for example, to optimize lanes and traffic. As a further example, the described system can be used on highways to count traffic and detect potentially-dangerous vehicles that are either stop or running at too low speeds.

The described system can also be used to monitor rail level crossings, tracking pedestrians and vehicles to ensure there are no obstructions on the rails. The described system can be used to reduce the environmental impacts on 5G millimeter wave signals through the anticipation of user position with respect to 5G signal blockers. The system can identify, track and predict the future location of users and potential obstacles to millimeter waves and relay this information back to the base station such that it can take appropriate predictive actions (e.g. increase power or select a different path by beamforming).

The proposed video based tracking systems and methods may further include the ability to remove noisy observations from the detection data based on assessing the 3D properties of the detected objects. For example, the systems and methods may include the use of noise thresholds applied to depth, width and height of a detected object, where, in response to detecting an object outside of the thresholds, the object is discarded. The use of thresholds may allow for better filtering of noisy observations.

In some example embodiments, the systems and methods include one or more additional cameras capturing imaging streams of a region of interest that is similar to or overlaps the region of interest of the first imaging device. That is, a second camera can have a field of view with a portion that overlaps with at least a portion of the field of view of the first camera. A second image processor processes the second imaging stream in a manner similar to the first imaging stream, and the fusion processor receives and generates the fused 3D referenced data by fitting the detection data entries and the second imaging stream detection data. With the second camera having an overlapping field of view with the first camera, the accuracy of the system may be increased. Moreover, as a result of the respective image processors being trained to generate detection data entries of a position of a detected object or object parts, and the fusion processor being responsible for fitting detection data entries to the shape and the trajectory of the detected objects, the system may allow for greater operability with various imaging device types, as the fusion processor is not trained to determine paths based on a specific camera type calibration. Using multiple cameras that have overlapping fields of view can increase accuracy of the detection data as multiple cameras can capture an object within the overlapping field of view. Using multiple cameras that have fields of view with regions that do not overlap other cameras can increase the overall coverage area or region of interest.

In some embodiments, for example, the second camera captures imaging streams of a region of interest with a portion that overlaps with a portion of the region of interest of the first camera. A portion of the region of interest captured by the second camera does not overlap with the region of interest captured by the first camera. With the non-overlapping portions of the regions of interest captured by the first and second camera, the proposed system may be able to extend or increase an overall area of interest for which a detected object can be tracked (i.e., a coverage area for detected objects). The area of interest can include the regions of interest captured by the first and second camera, and the regions of interest captured by additional cameras.

In an example, a first camera has a first field of view (to capture a first region of interest) and a second camera has a second field of view (to capture a second region of interest). The first field of view and the second field of view have portions that do not overlap. The first field of view and the second field of view can extend the overall region of interest captured by both cameras. A trajectory can have a first part in the region of interest and a second part in the second region of interest.

The first camera has a first field of view and the second camera has a second field of view. The first field of view and the second field of view have portions that overlap. One or more of the detected objects are included in the first imaging stream and the second imaging stream. The system can use detection data from both imaging streams to improve the detection data for the detected objects.

For many applications the orientation and extent of the object can be approximated with a rectangular cuboid, and estimating its pose is useful for tasks such as potential collision estimation in automated driving and road occupation in traffic monitoring.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), at least one sensor (e.g., a camera imaging device), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the following discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

Figure 1B:
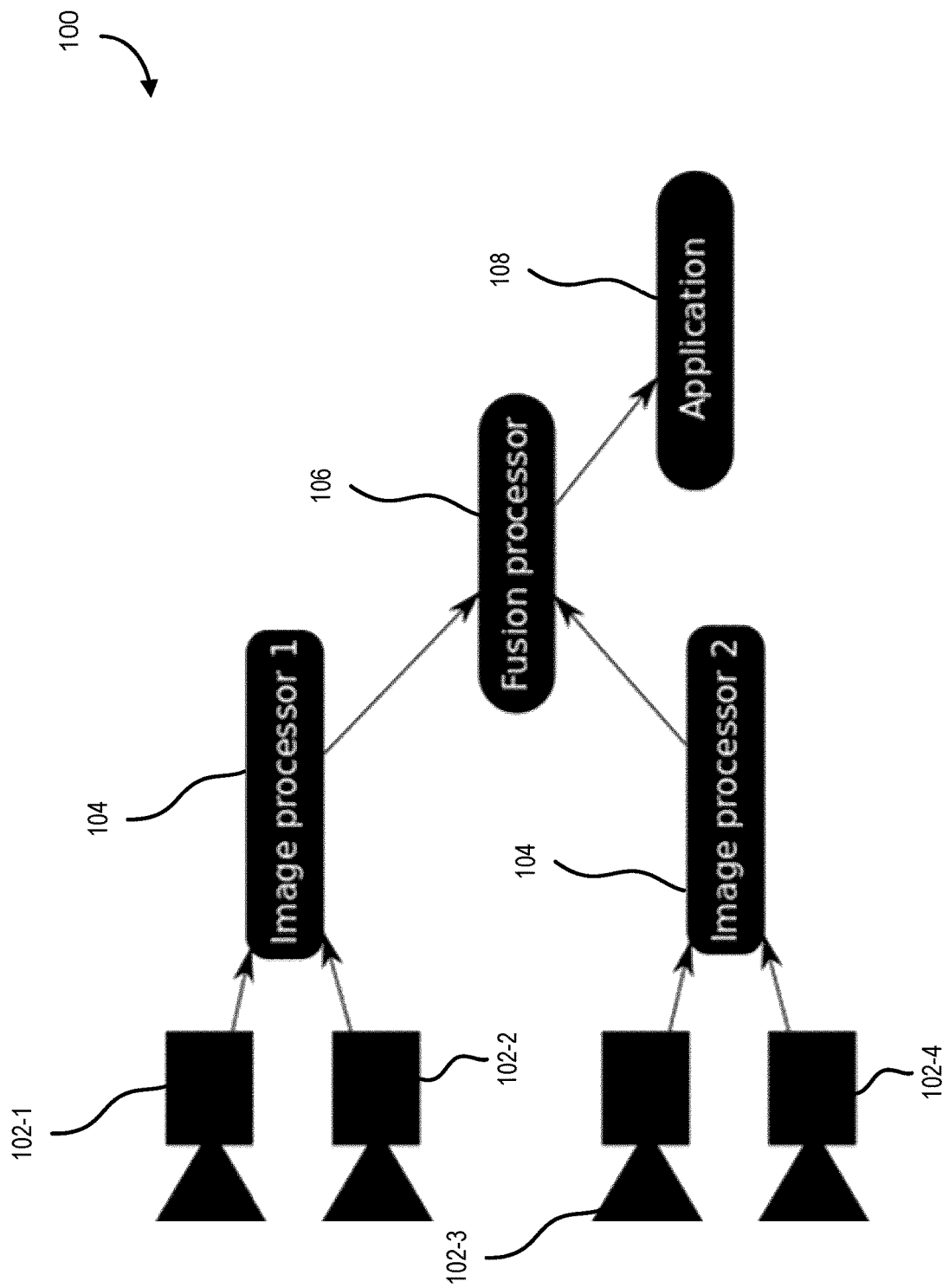
FIG. 1B is a schematic diagram of the system of FIG. 1A, in accordance with example embodiments.

Referring now to FIGS. 1A and 1B, an example system 100 for tracking objects in video data is shown.

As shown in FIG. 1A, the system 100 comprises one or more imaging devices 102, (shown in FIG. 1B as a first imaging device 102-1, a second imaging device 102-2, a third imaging device 102-3, and a fourth imaging device 102-4) for generating video data sets of one or more regions of interest. There may be additional imaging devices and these are shown as an example illustration. The imaging devices 102 may be optical cameras, thermal cameras, or various types of imaging devices 102 capable of generating a video data stream of the region of interest.

In example embodiments, the one or more imaging devices 102 are oriented toward a traffic region of interest and generate video data representative of a traffic intersection or other transportation passageway. The one or more imaging devices 102 may be oriented towards a parking region of interest and generate video data representative of a parking lot or other vehicle storage location.

The one or more imaging devices 102 may simultaneously be oriented towards multiple regions of interest and generate multiple video data sets. In example variants, the one or more imaging devices 102 generate video data of a highway and also generate video data of a parking lot of a nearby hotel. Multiple variants of one or more imaging devices 102 generating video data directed to various regions of interest are contemplated. The system 100 can be used for different applications, and the vehicle related application is described as an illustrative example.

The video data sets include a plurality of frames, which frames may include a representation of one or more objects. The one or more objects can include, for example, pedestrians, vehicles, fixtures, buildings and so forth. According to some embodiments, one or more frames may include no (i.e., zero) objects. For example, an intersection may be empty.

According to some embodiments, the one or more imaging devices 102 generate and transmits the video data sets in real time. Alternatively, the one or more imaging devices 102 may store generated video data sets for transmission at a later time. For example, the one or more imaging devices 102 may be configured to record the imaging streams for two hour intervals and transmit the two hour interval of video data after the interval has lapsed.

The system 100 includes one or more image processors 104 (e.g., a plurality of image processors) in communication with the one or more imaging devices 102, by way of the communication network 110, to receive the generated video data sets. For example, as shown in FIG. 1B, the image processor 104 may include a first image processor 104-1 and a second image processor 104-2. For ease of reference, the one or more image processors 104 shall be referred to in the singular in the remainder of this document. The image processor 104 is a hardware processor.

According to some embodiments, for example, two or more imaging devices 102 are connected to each image processor 104. In some variants, one imaging device 102 is connected to more than one image processors 104. Variations or combinations of the image processors 104 and the imaging devices 102, and connections between the image processors 104 and the imaging devices 102 are contemplated.

The image processors 104 may be part of a computing system 101. For example, the image processor may be a dedicated processor on a server computer system 101. Other variants are contemplated. The computing system 101 can be one or more hardware computer devices for example.

The computing system 101 may include one or more databases 112 used by the image processor 104, a fusion processor 106, or an application 108 to store, or to retrieve, data associated with video-based tracking systems and methods. For example, the database 112 may store the plurality of parameters representative of a trained machine learning model used to detect objects represented in the video data set.

The image processor 104 generates detection data for object representations (referred to hereinafter as "objects") within the video data sets. For example, the image processors 104 may generate detection data entries upon determining an object (such as a vehicle, a pedestrian, a bike, and so forth) is present in the video data sets, or upon determining that a part of the object is present in the video data sets.

Figure 2:
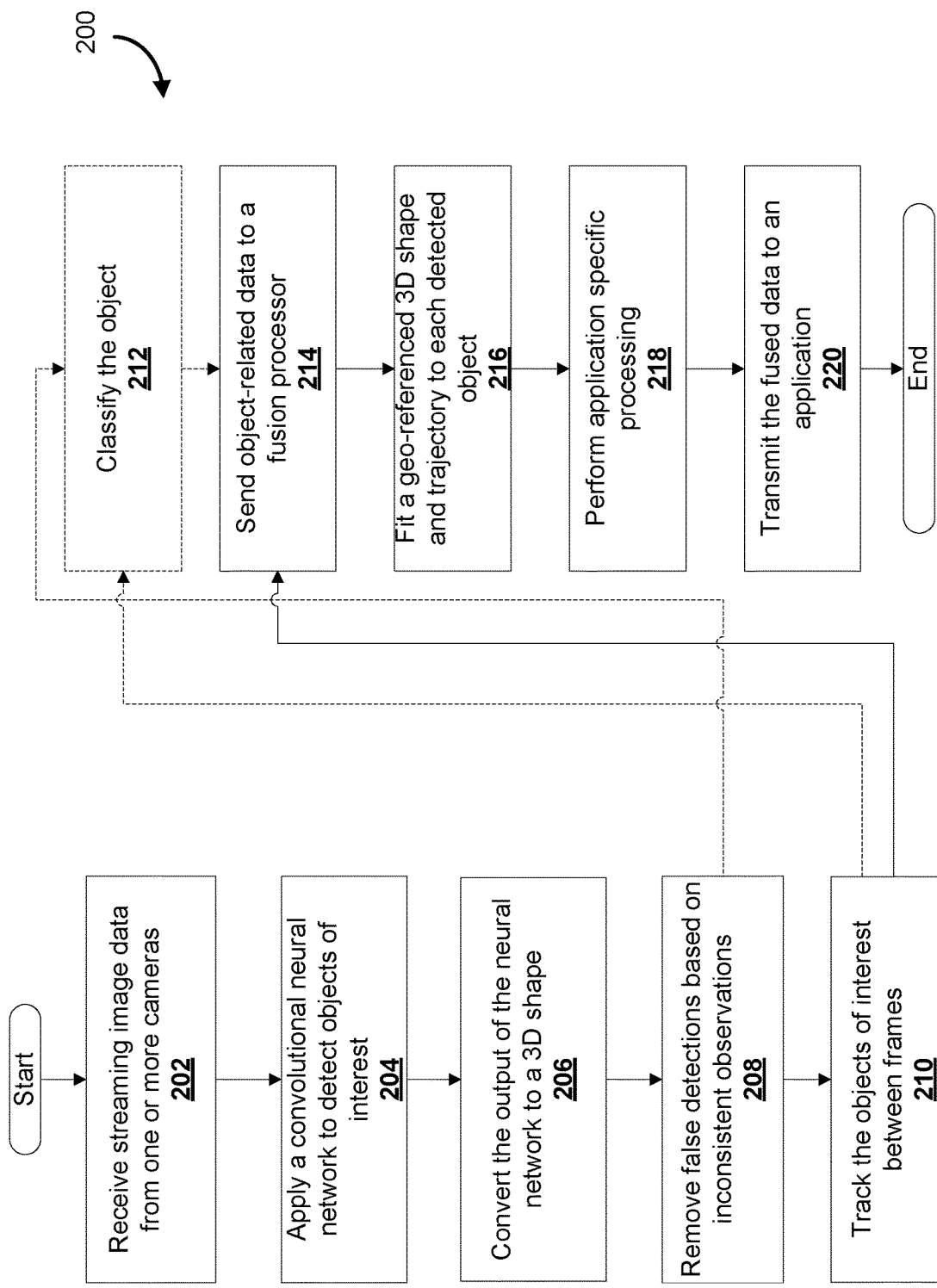
FIG. 2 is a flowchart of an example of method for visualizing workplace layout safety in accordance with example embodiments.

Referring now to FIG. 2, an example method 200 for processing video data sets with an image processor (e.g., the image processor 104) is shown, according to some embodiments.

At step 202, the image processor 104 receives an imaging stream from a single imaging device 102. In some example embodiments, the image processor 104 can receive multiple imaging streams from multiple imaging devices (e.g., imaging devices 102-1 and 102-2) and independently processes each imaging stream with steps 204-220. That is, the image processor 104 can receive and process an imaging stream from an imaging device 102-1 for detecting objects, and the image processor 104 can also receive and process another imaging stream from another imaging device 102-2 for detecting objects. The imaging devices can have overlapping fields of view (or portions thereof) and processing imaging streams capturing detected objects within the overlapping fields of view can increase the accuracy of the detection data. The imaging devices can have fields of view with portions that do not overlap to extend the region of interest for detecting objects.

At step 204, the image processor 104 uses an object detection network 104-1 (e.g., stored in database 112) to process the received imaging stream to generate output that corresponds to detected objects of interest in the frames of the video data. The output data can be referred to hereinafter as "detection data" made up of detection data entries. The detection data output that corresponds to detected objects of interest in the frames of the video data can include a position of the detected object in the respective imaging stream frame as a detection data entry. In some embodiments, the object detection network 104-1 is a network of hardware components configured to output as the detection data entry, for each detected object, the image coordinates (e.g., the pixel coordinates) of a cuboid containing the given object. In some embodiments, the detection data entries include 3D referenced location data of the object in the frame.

According to some embodiments, the object detection network 104-1 outputs detection data entries which include 12 additional values per detected object, representing the 2D pixel coordinates of 6 cuboid vertices. In some embodiments, the remaining two vertices of the 2D pixel coordinates of the cuboid are computed analytically from these 12 additional values. In some embodiments, the additional values are 3D referenced, or the additional values may be image coordinates.

In some embodiments, the object detection network 104-1 outputs detection data entries that represent 2D pixel coordinates of object parts. In some embodiments, the object detection network 104-1 outputs detection data entries that include additional values linking 2D pixel coordinates of object parts to other 2D pixel coordinates of object parts.

In some embodiments, the object detection network 104-1 is a convolutional neural network, such as a fully-convolutional neural network. Other object detection networks are contemplated, such as region proposal networks.

According to some embodiments, for example, the convolutional neural network object detection network is trained to output a 3D bounding box of the detected objects. The 3D bounding geometry may be a rectangular cuboid, or other variants of 3D shapes depending on the data used to train the convolutional neural network. For example, the 3D bounding geometry may be a sphere or ovoid.

In some embodiments, the convolutional neural network 104-1 is trained to output 2D pixel locations of pedestrian parts, such as feet, head and shoulders. In some embodiments, the convolutional neural network 104-1 is trained to output additional 2D pixel locations of parts of vehicles such as wheels, left and bumper sides, left and right windshield sides or other vehicle parts.

The object detection network 104-1 (e.g., convolutional neural network) can be trained to output the projection of the 3D bounding box (e.g., a rectangular cuboid) based on predicting the pixel locations of vertices in the image corresponding to the object. For example, the object detection network 104-1 can be trained to output the 8 vertices of a rectangular cuboid bounding box. In a non-limiting example embodiment, the object detection network 104-1 (e.g., convolutional neural network) outputs 6 vertices of the cuboid, from which the other two vertices can be obtained analytically.

The object detection network 104-1 (e.g., a trained convolutional neural network) may also generate output data (e.g. detection data entries) that can be used to define and render axis—aligned bounding boxes. The bounding boxes can be displayed as visual overlays on video data in a interface of a display device. For example, the object detection network 104-1 may output axis-aligned bounding boxes upon receiving a request for, or being calibrated to provide, axis-aligned bounding boxes from or to application 108.

In some embodiments, training the object detection network 104-1 includes processing training data having video data sets annotated with bounding boxes.

The training data may be data from a third party or stored on the system 100 (e.g., in database 112), or the training data may be generated by the system 100. For example, the training data may include synthetically-generated images with a synthetic data generation process.

Generating training data may include overlaying objects on background images whose calibration is known. For example, the synthetic data generation process places objects on the ground and simulates different illumination and occlusion conditions. In a non-limiting embodiment, synthetically generating images includes using raytraycing to overlay on the background image the objects of interest, creating different images while retaining existing annotations.

In some embodiments, synthetic data is generated using a generative adversarial network (GAN), Variational Autoencoder, or other generative network that takes as its input a background image and overlays an object from the plurality of classes and generates the pixel location of its projected cuboid. In another non-limiting example, a raytracing algorithm can be used to overlay objects on a background image and the overlaid image is fed to the GAN, Variational Autoencoder, or other generative network that simulates illumination and coloring effects to make the synthetic image look more realistic. In other embodiments, synthetic data is generated by a GAN, Variational Autoencoder, or other generative network that generates both the background and objects from the plurality of classes.

The object detection network 104-1 may also be trained with datasets that contain no cuboid or part annotations. For example, a training process may digest a mix of axis-aligned 2D bounding box annotations as well as 3D cube annotations and part annotations. For example, the axis-aligned 2D bounding box annotations may be used as training data to train the network to determine a general or approximate location of the object in the imaging data, and the 3D cube annotations may be used to train the machine learning model to determine the location of the projected cuboid on the image.

In example embodiments, the system 100 includes an annotator assistant (not shown). The annotator assistant may be configured with parameters representative of vanishing points and how parallel and perpendicular lines behave to minimize the amount of clicks and iterations needed to annotate a cube. In example embodiments, the annotator assistant restricts the available or presented actions (e.g., no clicking function are available on a certain location of a user's screen) to a user within an interface. For example, a user may be precluded, where a face of a cuboid has been defined, to select a further vertex point which is not orthogonal to the existing face.

In some embodiments, for example, the annotator assistant is a separate user interface. Alternatively, the annotator assistant may be an application which is integrated into an existing user interface.

At step 206, the image processor 104 generates a 3D most probable geometry (alternatively referred to as a detected shape) and position (e.g., in some embodiments, the imaging stream frame positions) detection data entry for the detection data generated at step 204, with, for example, a size and position detector 104-2.

The most probable 3D geometry and position detection data entries can be determined in association with a reference environment model. The reference environment model defines a coordinate system independent of the view and orientation of the imaging device(s) 102 capturing the imaging steams.

For example, the reference environment model can be determined based on a calibration procedure which may involve the image processor 104 determining the internal geometric properties of the camera (e.g., a focal length configuration, resolution, lens distortion, etc.). The calibration can also involve the image processor 104 determining the position and orientation of the camera with respect to a reference environment.

The image processor 104 may implement the camera calibration using a method based on a calibration pattern. The coordinate of any pixel generated by the camera imaging device 102 can be related to a 3D line of sight in a 3D reference coordinate system.

Furthermore, the image processor 104 calibration may include obtaining a model of the environment composed of visual elements (possibly provided by an orthophotograph, a geographical information system, or a CG model) and a reference geometry (possibly provided by a simple horizontal plane, a digital elevation model, a laser scan, or any other 3D reconstruction method).

In some variants, the image processor 104 then processes corresponding pixel locations in the one or more images (the one or more images taken with the camera imaging device 102 being calibrated) and the reference environment model with a Perspective-n-Point solver that computes the camera location and orientation with respect to the 3D environment model. The solver estimates the pose of a calibrated camera given a set of n 3D points in the world and their corresponding 2D projections in the image.

In a non-limiting example embodiment, determining the most probable 3D geometry and position with respect to detection data includes determining a rectangular cuboid representation of the object.

The image processor 104 may determine the rectangular cuboid representation of the object by determining lines of sight corresponding to the 2D cuboid vertices' positions based on the camera calibration and the reference environment model. For example, where the image processor 104 is processing imaging stream frames, the image processor 104 determines the one line of sight between the first imaging device 102-1 and a first vertex of an object defined by (x, y, z) based on a known position of the first imaging device 102-1, and a second line of sight between the first imaging device 102-1 and a second vertex (e.g., a bottom left and right cuboid vertices) based on a known position of the first imaging device 102-1.

The image processor 104 subsequently intersects the 3D lines of sight corresponding to the vertex (e.g., a bottom cuboid vertices) with the reference environment model. Intersecting the 3D lines of sight corresponding to the bottom cuboid vertices with the reference environment model may aid the image processor 104 in determining a footprint of the object.

The image processor 104 then determines vertical lines (or lines locally perpendicular to the ground) passing through intersection points of 3D lines of sight corresponding to the bottom cuboid vertices and the terrain model of the reference environment model, and determines the point nearest to the top cuboid vertices lines of sight. In this way, the imaging processor 104 may adjust the generated object shape data based on the determined footprint of the object.

Using these 3D points (e.g., the point nearest to the top cuboid vertices lines of sight) the image processor 104 constructs the rectangular cuboid representation and can estimate, and incorporate into the detection data entry, a first cuboid width, length, height, position and orientation.

The image processor 104, according to the non-limiting embodiment, subsequently uses the Levenberg-Marquardt algorithm to refine the estimated cuboid size and pose to update the detection data entry by minimizing the reprojection errors, e(X), defined by:

$$e(X) = \mathrm{Sum}_{i=1,8} \|(v\_i - P\_i(X))\|^2 \quad (1)$$

where X is a 6D vector containing (width, length, height, positionX, positionY, orientation); v_i is the ith 2*d* cuboid vertex position predicted by the CNN; and P_i(X) is the projection on the image of the ith vertex constructed with the cuboid described in X and lying on the reference environment model.

At step 208, the image processor 104 removes or rejects the detection data entries which include spurious or incorrect data. In some embodiments, the image processor 104 rejects any detection data entries which satisfy a noise threshold.

In example embodiments, the noise threshold may be based on determining that the detection data entry represents an object that is too large or too small to be a given object based on a classification of the object, and an expected object classification's size (depth, width, and height), location, and orientation on the ground plane. For example, detected vehicle objects (which objects may be classified with classifier 104-5)) having associated locations that are outside the areas where vehicle objects can be located may be removed or rejected (e.g. cars on roofs or sidewalks are removed) for satisfying the noise threshold. In another non-limiting embodiment, the image processor 104 may determine that detecting a vehicle object in the sky satisfies a noise threshold, and removes the object detection or stops tracking the vehicle object.

At step 210, the image processor 104 generates and updates tracking data for objects (represented by the most probable geometry and position of a generated object shape data) within the video data. Alternatively stated, the image processor 104 may update or link detection data entries of a detected object with new detection data entries of the same object from new frame observations.

In example embodiments, the image processor 104 uses a Probabilistic Tracker 104-3 (e.g., Kalman Filter-based on Particle-Filter-based) and associates each detected object with a unique identifier and tracks the location and speed on the ground (or other reference geometry) of objects from frame to frame (alternatively stated, between frames within the video data).

The image processor 104 may maintain the tracked location, and speed related to the unique identifier of an object in a database 112, or store the information in a local memory (not shown).

The probabilistic tracker 104-3 maintains the collection of tracks (detection data entries associated with a specific detected object), which can include object identifiers, and the related location and speed of the objects. The collection of tracks can include objects entering and leaving the field of view of the imaging device 102. For example, the probabilistic tracker 104-3 may track, by storing or relating detection data entries associated with a detected car object in an imaging device 102 with a unique identifier, with a determined location, and relatively small size owing to the car object entering the field of view of the camera. The probabilistic tracker 104-3 may track, by storing or relating detection data entries associated with said car object's second location, as it nears the imaging device 102, with the unique identifier, storing the car objects increased size as a result of it approaching the camera. Finally, the probabilistic tracker 104-3 may further store or associate detection data entries of a third location of the car with the unique identifier, and a corresponding decreased size as the car leaves the view of the imaging device 102.

The probabilistic tracker 104-3 may associate detection data entries with the unique identifier by performing an association test between each object detected in an image of the video data and the existing collection of tracks. For example, the probabilistic tracker 104-3 can be configured to retrieve, for a first image in a video data set, (1) the most probable geometry and position with respect to detection data and (2) a previously stored track.

In response to determining that the degree of association between the detection data entry having the most probable geometry and position of the object and the previously stored track of the object satisfies an association threshold, the probabilistic tracker 104-3 updates the previously stored track with the most probable geometry and position with respect to detection data for the object in the first image in the video data set. In response to determining that the degree of association between the most probable geometry and position with respect to detection data and the previously stored track does not satisfy the association threshold, the probabilistic tracker 104-3 may generate a new track (e.g., a new detection data entry) and a new unique identifier for the most probable geometry and position of the generated object shape.

According to some embodiments, for example, the probabilistic tracker 104-3 determines degree of association with the previously stored track based on an output generated by an appearance model processing the video data set. The appearance model 104-4 may process the video data set based on a classifier making use of the random ferns learning process which detects objects in the image or computes similarity between two objects based on color histogram or histogram of oriented gradients.

In example embodiments, the appearance model 104-4 is used to refine object tracking where it is known or suspected that the object detection network 104-1 failed to detect and object in a frame. For example, where the track of an object includes a location and speed that when processed by the image processor 104, generates an expected location that is within the field of view of the imaging device 102 in a second frame, and the object detection network 104-1 does not detect the object in the second frame, the image processor 104 may be configured to process the second frame with the appearance model 104-4.

In some embodiments, the probabilistic tracker 104-3 determines an association with the previously stored track based on a combination of the output generated by an appearance model 104-4, and the most probable geometry and position with respect to detection data. Various combinations are contemplated.

At step 212, optionally, the image processor 104 may determine whether the detected object in the video data belongs to a first category of a plurality of categories. For example, image processor 104 may determine that a detected object is a vehicle category, or the detected object is a sedan type vehicle category, and so forth.

The image processor 104 can determine whether the detected object in the video data belongs to the first category of the plurality of categories by extracting a subset of the frame of the video window, associated with the first object and processing the subset with the classifier 104-5. In some embodiments, the image processor 104 processes 2 or more subsets of two separate frames of the video data associated with the detected object with the classifier 104-5 to determine whether the detected object belongs to the first category of the plurality of categories.

At step 214, the image processor 104 transmits the tracks (i.e., the detection data entries) to the fusion processor 106. The image processor 104 may also transmit the video data sets to the fusion processor 106.

At step 216, the fusion processor 106 generates 3D referenced fused data using the detection data entries of the detected objects generated by all image processors 104 within the system 100. In example embodiments, the fusion processor 106 generates 3D referenced fused data using the detection data entries of the detected objects generated by one or more but not all image processors 104 within the system 100.

The fusion processor 106 generates the 3D referenced fused data, in example embodiments, by combining all observations (e.g., detection data entries) over a time window and finds the best trajectory to explain all these observations. Alternatively stated, the fusion processor 106 does not only compute where the detected object is in a current frame, but also where it was 5 seconds before, knowing all observations up to the current frame.

The fused 3D referenced data may include data which expresses object shape and trajectory information in the reference environment model coordinate system. For example, the 3D referenced fused data may include geo-referenced coordinate locations for detected objects within the imaging data.

The fused 3D referenced data may be generated by the fusion processor 106 fitting a geo-referenced 3D shape and trajectory to the detection and tracking data for the detected objects.

Figure 3:
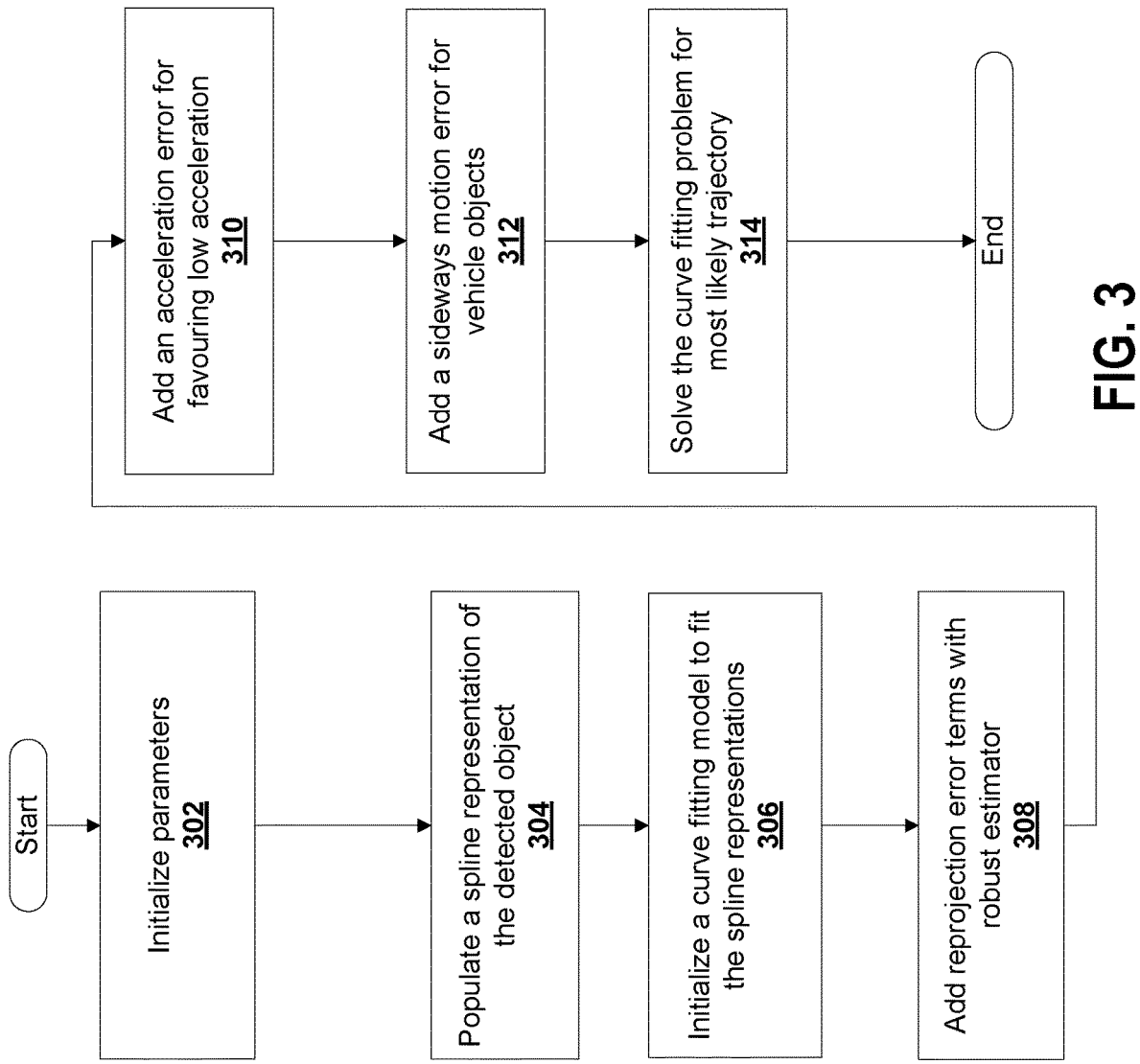
FIG. 3 is a flowchart of an example of method for visualizing workplace layout safety in accordance with example embodiments.

Referring now to FIG. 3, a method 300 of estimating an object trajectory with the fusion processor 106, according to example embodiments, is shown.

At step 302, the 3D shape and trajectory parameterization 106-1 (hereinafter referred to as the parameterization 106-1) allocates parameters to define the solution domain of possible shapes and trajectories (i.e., the test trajectories and test shapes) of the detected object (P). For example the parameters may contain cuboid width, length and height (parameterizing the shape) and positions regularly sampled over the time period [max(tn-D, t0), max(Tr, tn)], t0 being the time of the oldest observation available, tn being the time of the latest observation; D being the duration of the optimizing time-window; and Tr being the time at which the system needs a pose estimate for the tracked object.

The parameterization 106-1 may determine the solution domain in the form of a vector space. In some embodiments, the parameterization 106-1 is implemented to have parameters for 3 real numbers for width, length and height and N×3 real numbers for position x, position y, and angle, where N is the number of spline knots and is large enough to cover the tracking duration.

In some embodiments where objects have N object parts, the parameterization 106-1 is implemented to store N×3 real numbers for position x, position y, and position z for each part of the object being tracked. In some embodiments, M parts that are known to be on the ground are represented with M×2 real numbers for position x and position y.

In some embodiments where objects have N object parts, the parameterization 106-1 is implemented to store 3 real numbers for reference position x, reference position y, and angle, and N−1 real numbers for position x, position y and position z of each object part except for a reference object part.

According to some embodiments, for example, it is also possible for the parameterization 106-1 to use a solution space spanning full 3D trajectories, requiring 6 unknowns per spline knot, 3 for the position and 3 for the orientation, making it possible to model the trajectory of flying objects such as drones. In some embodiments, parameterization 106-1 might include as parameters a set of 3D points S in the object coordinate system and the image observation error cost 106-3 (discussed herein) may additionally compare the pixel motion flow observed on the image stream with the one that would be produced by the motion of the 3D points S according to the parameter values to determine the parameter values likelihood.

At step 304, the parameters allocated at step 302 are populated with a spline representation of the detected object by the fusion processor 106. In example embodiments, the spline representation is populated using a combination of a) a previously computed estimation of the most probable geometry and position with respect to detection data entries for multiple frames of the imaging stream or b) the cuboid fitting described in step 206, or c) by extrapolating motion according to a previous estimate. For example, if the fusion processor 106 previously computed a trajectory up to time A for the detected object, the fusion processor 106 might extrapolate the position at time B by adding to the position at time A the velocity at time A multiplied by the time between A and B.

At step 306, the fusion processor 106 initializes a maximum likelihood problem P to fit the populated spline representation, for example an empty Levenberg-Marquardt least squares problem.

At step 308, the fusion processor 106 may, for each detection data entry of the detected object that falls within the time period covered by parameterization 106-1, add a reprojection error cost 106-3 to P.

In some embodiments, the reprojection error costs 106-3 compare the image projection of the parameterized position (e.g., the test trajectory and test shape) at the observation times (obtained by sampling the spline S at the observation time and projecting it to the camera image), with projected cuboid vertices from detection data entries (e.g., the detected shape).

In example embodiments, the image observation error cost 106-3 includes a robust estimator to avoid overweighting bad detections, thereby modeling the non-gaussian distribution of detection errors.

The image observation error cost 106-3 may processes elements from the solution domain (i.e., test shapes and test trajectories) and output how likely the particular solution is (i.e., determine the likelihood of a test trajectory and a test shape) considering a particular image observation (e.g., a detection data entry), such as a cuboid output of the CNN of the detected object in a single frame. Alternatively stated, the image observation error cost 106-3 answers the question: How likely is it that the solution is X, given that the image processor 104 detected the object modeled by X on this cuboid?

The image observation error cost 106-3 can be instantiated multiple times, based on observations from multiple images, coming from one or more cameras, taken at different times. For example, the image observation error costs 106-3 may determine how likely the particular solution is considering observations from multiple frames of the same imaging device 102 observing the object at different times (on different frames) or from multiple cameras observing the same object. For example, the image observation error cost 106-3 can be used to compare whether a particular detection data entry does not fit the test trajectory, where for example, it would be unlikely for the particular detection data entry of a car appearing on the left of the image to match a test shape and trajectory that places the car to the right of the image.

In some embodiments, the image observation error terms 106-3 use cuboid vertices reprojection distance as defined in step 210 as an error term.

In some embodiments, the image observation error terms 106-3 use part vertices reprojection distance as defined in step 210 as an error term.

In some embodiments, the image observation error cost 106-3 may compare the pixel motion flow observed on the image stream with the one that would be produced by the motion of the 3D points S according to the solution parameter values to determine the solution likelihood.

Optionally, at step 310, for N points sampled regularly, the fusion processor 106 may add acceleration error costs to P that favors low-acceleration trajectories.

As part of step 310, the fusion processor 106 may process the solution space with a shape and motion priors 106-2 which take an element from the solution domain and output how likely this solution is based on previously existing object shape and motion information or algorithms. The shape and motion priors 106-2 may answer questions such as: how likely is it that a car is 5 m wide? 0.5 m wide? 50 m wide? The shape and motion priors 106-2 may determine how likely is it that a car drives at 200 meters per second? or 2 m/s? The various numbers in these questions come from the element from the solution domain.

In some embodiments, the shape and motion priors 106-2 are configured to prefer solutions indicative of a smooth and realistic solutions (e.g., car trajectory), encouraging the solver 106-4 to prefer a smooth solution over one that includes jitter. The shape and motion priors 106-2 may beneficially overcome jitter associated with the noise present in object detections, such as with CNN object detector network 104-1 detections.

According to some embodiments, for example, the shape and motion priors 106-2 are pre-configured to favor solutions with a pre-configured restriction on angular acceleration and acceleration. For example, vehicle objects may be unlikely to exhibit high values of angular acceleration or acceleration. Such motion prior 106-2 encourages to solver 106-4 to prefer solutions without jittering and may be particularly effective at ignoring false detections.

Similarly, optionally, at step 312, for N points regularly sampled on the trajectory, the implicit fusion processor 106 may add a "sideway motion" cost to P that penalizes motion on an axis perpendicular to the wheels (cars move on the back-front axis, not on the left-right one) in response to determining the detected object is a wheeled vehicle object.

Various combinations of robust estimators (e.g. to avoid overweighting bad detections) and error costs (e.g. detection observation, pixel motion flow observation, shape prior, motion prior, acceleration, sideway motion) are contemplated. For example, the fusion processor 106 may add costs to sideways motions, impose restrictions on angular velocity and acceleration, and so forth.

At step 314, the probabilistic problem solver 106-4 solves the maximum likelihood problem P of step 306 for the optimal shape and trajectory of detected object (referred hereinafter as "fused data" or "3D referenced fused data"). Solving the maximum likelihood problem P may involve the probabilistic problem solver 106-4 finding the most likely element (e.g., the most likely test trajectory and test shape) of the solution domain created in step 302 by the parameterization 106-1, considering the terms determined or generated by the shape and motion priors 106-2 and image observation error costs 106-3.

In some embodiments, the probabilistic problem solver 106-4 implements a Levenberg-Marquardt algorithm that minimizes a sum of squares.

Fitting the geo—referenced 3D shape (e.g., the test shape) and trajectory (e.g., the test trajectory) to the detection and tracking data can include the parameterization 106-1 configuring the solution domain to include parameters that cover the object trajectory over a dynamic time window. For example, the dynamic time window may include 20 seconds of real time detection and tracking data for the object for each frame of the video data. In example embodiments, the dynamic time window is approximately 20 seconds. According to some example embodiments, the dynamic time window can be greater or less than 20 seconds.

The fusion processor 106 may be configured to fit the geo—referenced 3D shape and trajectory by fixing the shape of the detected objects based on dynamic time window, or a window preceding the dynamic time window. For example, the fusion processor 106 may use the shape of the detected object based on a frame where the object was in view of multiple imaging devices.

The fusion processor 106 can use the fixed shape to determine the position, a trajectory, and a subsequent position of the detected object between the frames in the dynamic window. In this configuration, the parameterization 106-1 assigns known 3D shape geometries (e.g., a previous estimate of the most probable geometry,) to the parameters associated with the object size (stated alternatively, the 3D shape parameters do not have unknowns), as the 3D shape remains constant. The probabilistic problem solver 106-4 does not attempt to change the shape of the object.

In some embodiments, the fusion processor 106, in the case of an object observed longer than the dynamic window, may configure the parameterization 106-1 to enforce trajectory continuity with a previous estimate of position and speed at the beginning of the dynamic window or may add a "continuity cost" to the shape and motion priors 106-2. For example, in a particular embodiment, in the case of a car parked in the field of view and observed for 10 minutes, the fusion processor 106 configures the parameterization 106-1 with: 1) a fixed shape obtained after 20 seconds of observation, 2) a fixed position at the beginning of the time window (i.e. time of current frame minus 20 seconds) corresponding to the position of the parked car (obtained when fusion processor 106 processed last frame) and 2) a fixed speed of 0 at the beginning of the time window (the speed estimated at that time when fusion processor 106 processed last frame).In some embodiments, the parameters associated with the trajectory of the detected object may be populated by interpolating tracking and dynamic data from sampled frames within the dynamic window at a regular intervals using the cubic spline. Various sampling techniques are contemplated. For example, the detected object tracking and dynamic data may be sampled at constant intervals, at intervals which have the most change from previous intervals, and so forth.

Although the discussion of method 300 includes a sequential embodiment between steps 302 to 314, other examples of method 300 may include various possible sequences of the disclosed steps. For example, step 312 may occur prior to step 310. In some example embodiments, some of the steps occur simultaneously. For example, the steps 308, 310, and 312 may occur simultaneously. Moreover, if one embodiment comprises steps A, B, and C, and a second embodiment comprises steps B and D, other remaining combinations of A, B, C, or D, may also be used.

Referring again to FIG. 2, at step 218, the fusion processor 106 performs application specific processing of the fused data. In example embodiments, the fusion processor 106 transmits, at step 220, the fused data to an application 108 in a form required by or enforced by an application programming interface (API), not shown, of the application 108.

The application 108 may include an interface (not shown) to render and display 3D visual overlays generated from the 3D referenced data (e.g., the fused data), whether generated by the application 108 or the fusion processor 106.

In some embodiments, the fusion processor 106 transmits the fused data to an application 108, which performs the application specific processing. Hereinafter, for simplicity, the fusion processor 106 shall be described as performing the application specific processing, however it is understood that the processing may be performed by the application 108.

In example embodiments, the application 108 requests and receives fused data from the fusion processor 106 associated with user objects to determine safety thresholds. For example, the application 108 may be an application for monitoring social distancing between identified user objects.

Figure 4:
FIG. 4 is a diagram of rendered video data including the fused data in accordance with example embodiments.

Referring now to FIG. 4, an interface 400 of rendered video data including fused data of user objects, according to example embodiments, is shown.

In the interface 400, the application 108 renders and displays 3D visual overlays of multiple user objects in the region of interest shown in both an imaging device view and a map view 406 in the interface 400.

Fusion processor 106, based on the fused data, determines whether the detected user object locations satisfy the safety threshold between user objects. The safety threshold may be a distance between user objects informed by current required social distancing guidelines.

As shown in the interface 400, user objects, denoted by white circles with black outlines, which do not satisfy the safety thresholds may be assigned a first visual indicator 404 by the fusion processor 106. User objects determined to be a sufficient distance from other users in the rendered video data can be denoted by a second visual indicator 402, e.g., a black circle with a white frame.

Figure 5:
FIG. 5 is another diagram of rendered video data including fused data of user objects in accordance with example embodiments.

Referring now to FIG. 5, which shows another interface 500 of the rendered video data including fused data of user objects. The interface 500 is representative of a rendering of 3D visual overlays of the same region of interest as shown in the interface 400.

In the interface 500, the user object surrounded by visual indicator 502 is determined not to satisfy a safety threshold, and application 108 renders the first visual indicator 502 to indicate that the user object has failed the safety threshold. In the shown embodiment, the first visual indicator 502 is a circle around the user object associated with the required distance between the user object and other user objects. The first visual indicator 502 may be various sizes or shapes visible during the 3D rendering generated by application 108. For example, the first visual indicator may be a semi-transparent sphere.

The first visual indicator 502 is shown in the interface 500 as a red circle. Variations of the first visual indicator having various colours, such as neon red, or any colouring pattern, such as blue stripes, are contemplated.

The application 108 interface may be able to generate different map views to indicate coordinates of detected objects relative to mapping data based on the fused data. In the embodiments shown in FIGS. 4 and 5, the map views 406 and 506 of interfaces 400 and 500 are a top down map view of the region of interest. Various map view orientations are contemplated, including a map view from another perspective.

The map view 406 may be, as shown, embedded into the rendered imaging device view video data by the application 108, or the map view may be shown separate from the rendered imaging device view video data (e.g., residing on one portion of a split screen). Various configurations of the map view 406 and the rendered imaging device view video data are contemplated.

Figure 6:
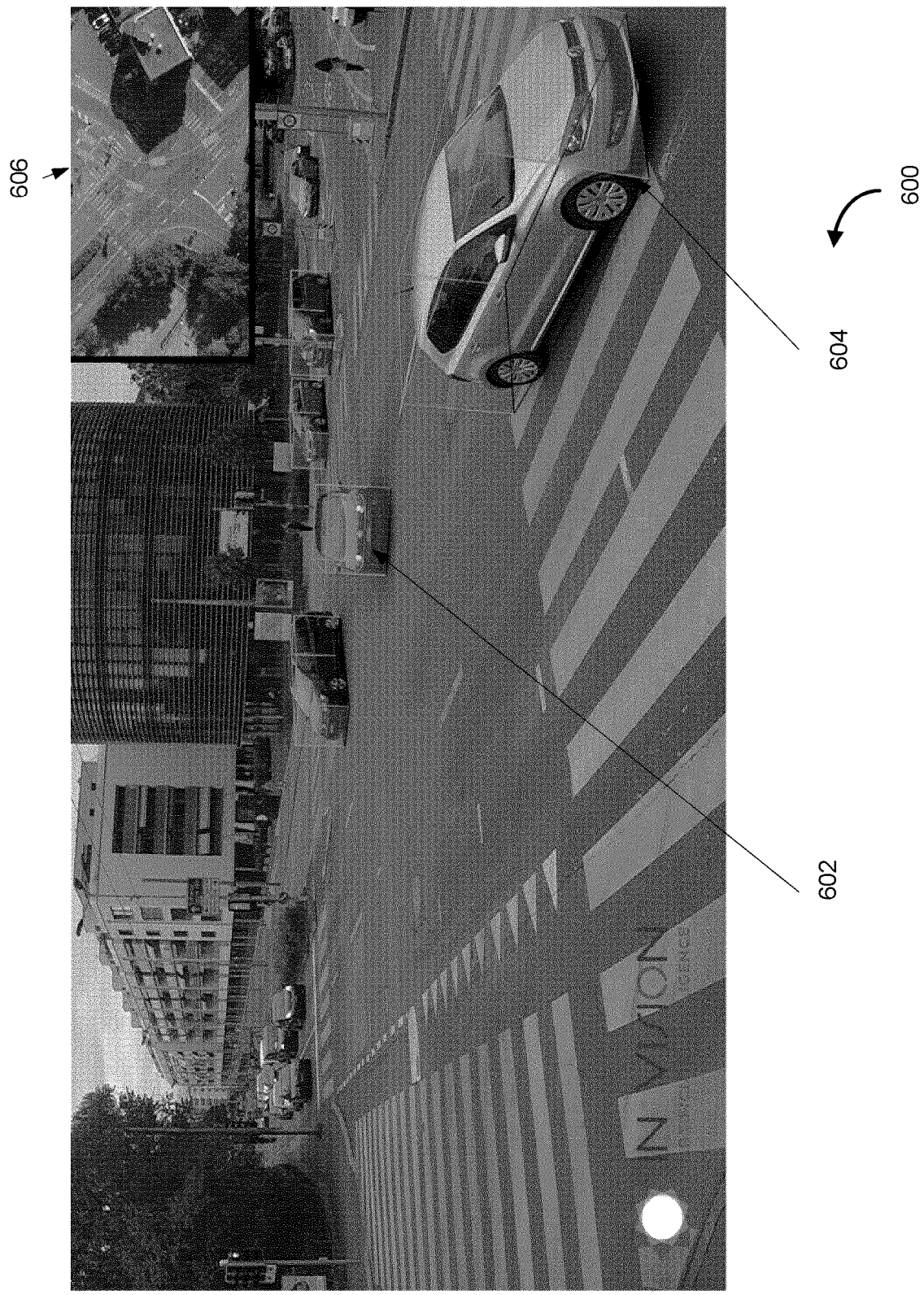
FIG. 6 is a diagram of rendered video data including fused data of vehicle objects according to example embodiments.

In example embodiments, the fusion processor 106 generates fused data of vehicle objects. Referring now to FIG. 6., an interface 600 of the rendered video data including fused data of vehicle objects is shown.

In the shown interface 600, the application 108 uses the fused data (e.g., the shape and trajectory) to render visual object representations on top of the vehicle objects, shown as representations 602 and 604. In the shown embodiment, the representations 602 and 604 are cuboids around the boundaries of the vehicle objects (e.g., as determined according to method 200). The first visual indicator 502 may be various sizes or shapes based on the fused data received by application 108. For example, the image processor 104 and fusion processor 106 may be configured to determine sizes and shapes of objects as spheres.

The visual object representations 602 and 604 are shown in interface 600 as blue/green cuboids. Variations of the visual object representations 602 and 604 having various colours, such as neon red, or any colouring pattern, such as blue stripes, are contemplated.

Figure 7:
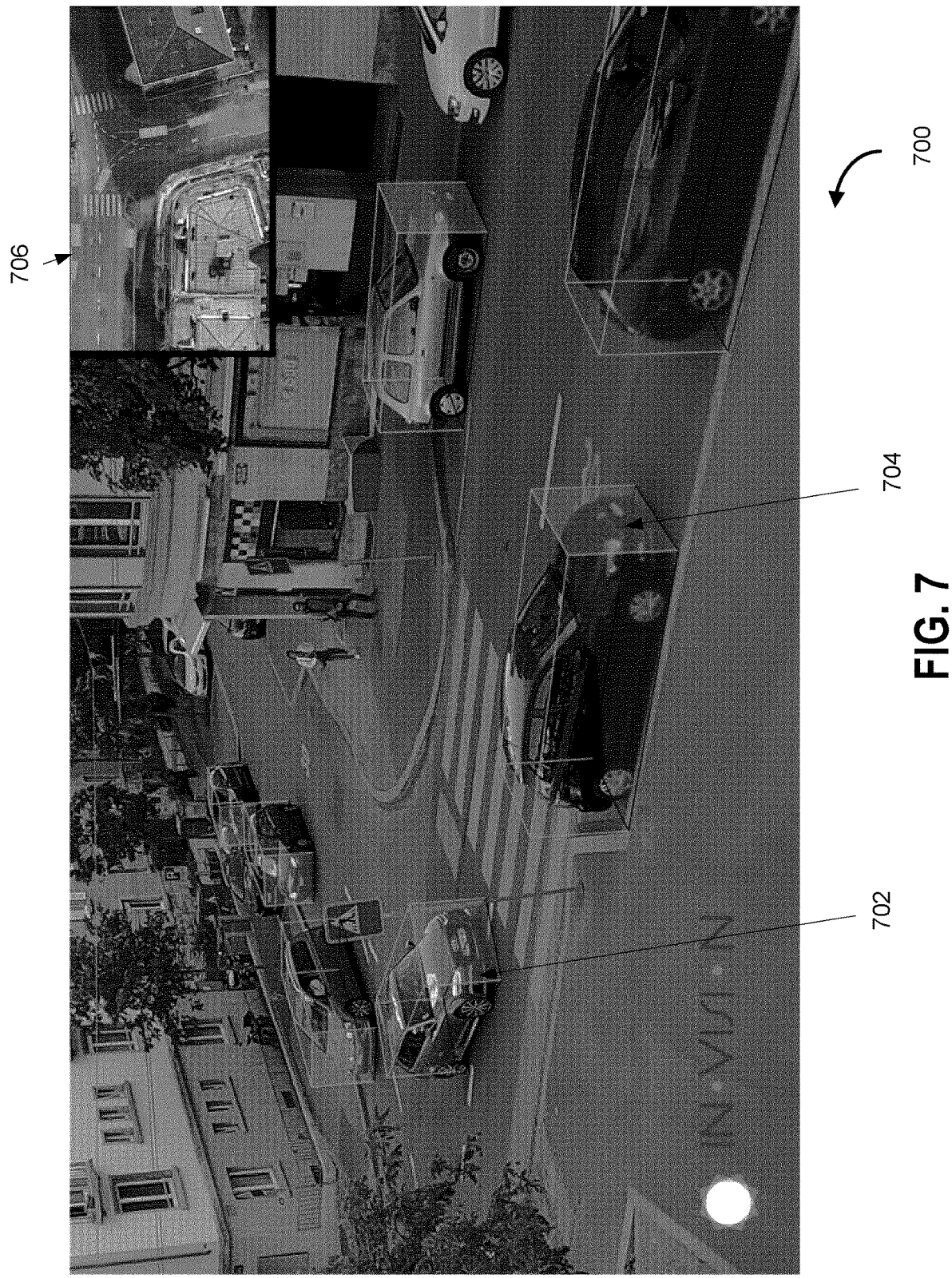
FIG. 7 is another diagram of rendered video data including fused data of vehicle objects according to example embodiments.
Figure 8:
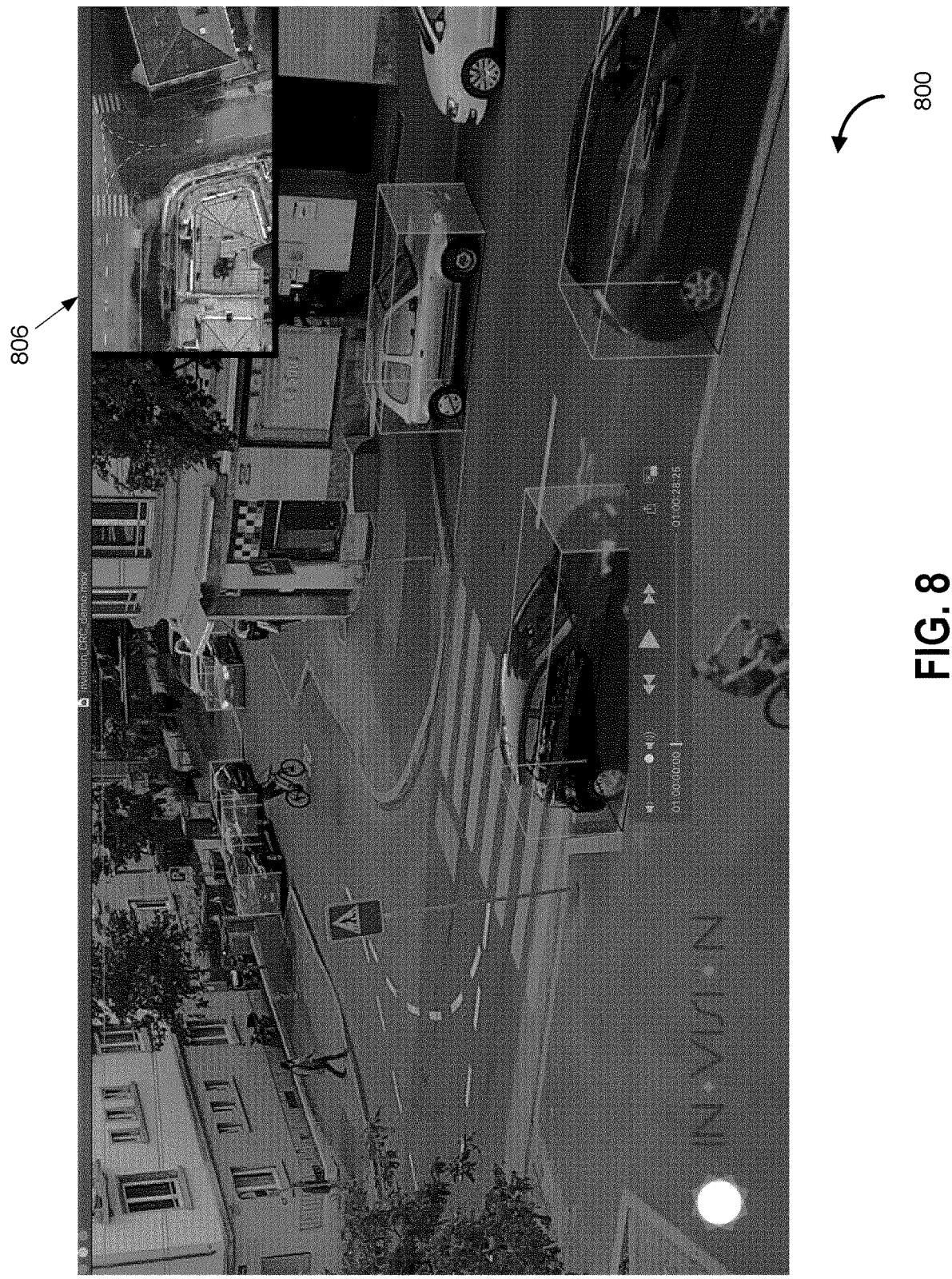
FIG. 8 is a further diagram of rendered video data including fused data of vehicle objects according to example embodiments.

Similar to the map views 406 and 506 in FIGS. 4 and 5, the application 108 may render the diagrams 600, 700, and 800 of FIGS. 6, 7, and 8 to include map views 606, 706, 806 of the region of interest shown in the respective diagram.

In example embodiments, the fusion processor 106 may process the fused data to determine whether the vehicle objects in the region of interest satisfy a safety threshold. For example as shown in FIGS. 7 and 8, showing interfaces 700 and 800 of a region of interest, the application 108 may determine that the safety threshold has not been satisfied within the region of interest based on how fast the vehicle objects move between the diagrams. For example, if the interface 700 and 800 visualizations are based on data captured a few seconds apart, the application 108 may determine that if a vehicle position between two frames is large enough based on the duration between the frames, the vehicle was travelling too fast.

Alternatively, the fusion processor 106 may determine that the safety threshold has not been satisfied based on the determined 3D referenced data and trajectory. In some variants, where the fusion processor 106 determines 3D referenced data and trajectory which indicate that a car is travelling above a speed limit, the fusion processor 106 may determine that the safety threshold has not been satisfied.

In example embodiments, the fusion processor 106 determines that the safety threshold has not been satisfied based on a determined confidence threshold. For example, where the 3D referenced data and trajectory are indicative of a trajectory of a car driving the wrong way on a one way road, the fusion processor 106 may be configured to determine a confidence threshold of the 3D referenced data and trajectory (e.g., the trajectory is likely, but not certain), and only determines that the safety threshold has not been satisfied after the trajectory satisfies the determined confidence threshold (e.g., it is 90% likely that the vehicle will make an infraction).

In some embodiments, the safety threshold is not satisfied in response to the fusion processor 106 determining that the trajectory of a vehicle object in the region of interest indicates a likely collision. For example, where a detected vehicle object is travelling too quickly and has a determined trajectory in the fused data which intersections another detected object trajectory, the safety threshold may not be satisfied.

In response to determining that the safety threshold is not satisfied, the fusion processor 106 may be configured to transmit a control signal to a traffic controller (shown as configurable device 114 in FIG. 1). The traffic controller may be a traffic light, or the traffic controller may be a traffic ticket generator, and the control signal may be a signal to change a traffic light, or a signal to issue a ticket to a vehicle object determined to be travelling too fast.

In example embodiments, the fusion processor 106 may process the fused data to determine whether the vehicle objects therein in the region of interest satisfy a traffic change threshold. For example, the application 108 may determine that the ratio of cars waiting for a traffic light to change relative to cars passing through an intersection is above the traffic change threshold, and transmit a control signal to the traffic controller to change the traffic lights. In another non-limiting embodiment, the application 108 may determine that a plurality of vehicle objects are waiting to make a left turn, and transmit a control signal to the traffic controller to extend a left turn signal duration.

The fusion processor 106 may be configured to determine a parking availability metric for the region of interest represented by the fused data. For example, the fusion processor 106 may include a preconfigured location of parking spots within a region of interest, and determine whether the location of any detected vehicle objects in the fused data overlap the preconfigured locations of parking spots to determining the parking availability metric. In response to determining that there are one or more locations of parking spots without an overlapping vehicle object, the application 108 may be configured to transmit a signal to a display unit configurable device 114 which displays the available amount of parking spots in the region of interest.

In example embodiments, the fusion processor 106 process the video data sets to generate fused data having signal impeding objects. For example, the classifier 104-5 of the image processor 104 may be trained to recognize objects which have known signal impedance properties (such as a crane). The fusion processor 106 may further process the video data sets to generate fused data having signal emitting objects (e.g., a radio tower). Alternatively, the fusion processor 106 may receive or retrieve a second data set (e.g., from database 112) including the location of signal emitting objects and signal emitting pathways.

The fusion processor 106 may determine whether the signal impeding objects overlap signal emitting pathways. In response to determining the signal impeding objects overlap the signal emitting pathways, the fusion processor 106 may be configured to transmit an alert to signal emitter operator configurable device 114. For example, fusion processor 106 may determine that an impeding crane object is in the signal emitting pathway of a signal emitter object, and notify the signal emitter operator.

According to some example embodiments, the transmitted alert may include an alternate signal emitting pathway (e.g., mobile radio routing data) determined by the fusion processor 106 as a pathway in the region of interest sufficiently similar to the original signal emitting pathway and not having an overlapping signal impeding object. The mobile radio routing data may also be determined based on an unimpeded pathway in the region of interest which is closest to the impeded pathway.

In some variants, for example, the application 108 receives fused data of signal absorbing objects. The fusion processor 106 may locally determine that a signal deterioration threshold is (or will soon be) satisfied where a threshold amount of signal absorbing objects is detected, reducing the ability of a signal emitting radio tower to exchange signals with receivers. For example, the fusion processor 106 may determine that there are signal absorbing objects (e.g., trucks, which may be assumed to be signal absorbing objects based on their detected category), and may further predict their motion, allowing the application 108 to find an alternative radio path to transmit signal to a specific receiver, for example by switching to an alternative emitting radio tower or by emitting through an alternative bouncing path.

In some example variants, the application 108 receives fused data of potentially colliding objects such as cars, trains, buses, bikes, animals or pedestrians. The application 108 includes a mean of preventing such collision, for example by raising an alarm or lowering a barrier. When the fusion processor 106 detects an intruding object in the collision area, it notifies the application 108 that can take the relevant action.

Although the discussion of method 200 includes a sequential embodiment between steps 202 to 220, other examples of method 200 may include various possible sequences of the disclosed steps. For example, step 212 may occur after step 204. Two or more steps may occur simultaneously. Moreover, if one embodiment comprises steps A, B, and C, and a second embodiment comprises steps B and D, other remaining combinations of A, B, C, or D, may also be used.

Communication network 110 may include a packet-switched network portion, a circuit-switched network portion, or a combination thereof. Communication network 110 may include wired links, wireless links such as radio-frequency links or satellite links, or a combination thereof. Communication network 110 may include wired access points and wireless access points. Portions of communication network 110 could be, for example, an IPv4, IPv6, X.25, IPX, USB or similar network. Portions of network 110 could be, for example, a GSM, GPRS, 3G, LTE or similar wireless networks. Communication network 110 may include or be connected to the Internet. When communication network 110 is a public network such as the public Internet, it may be secured as a virtual private network.

Figure 9:
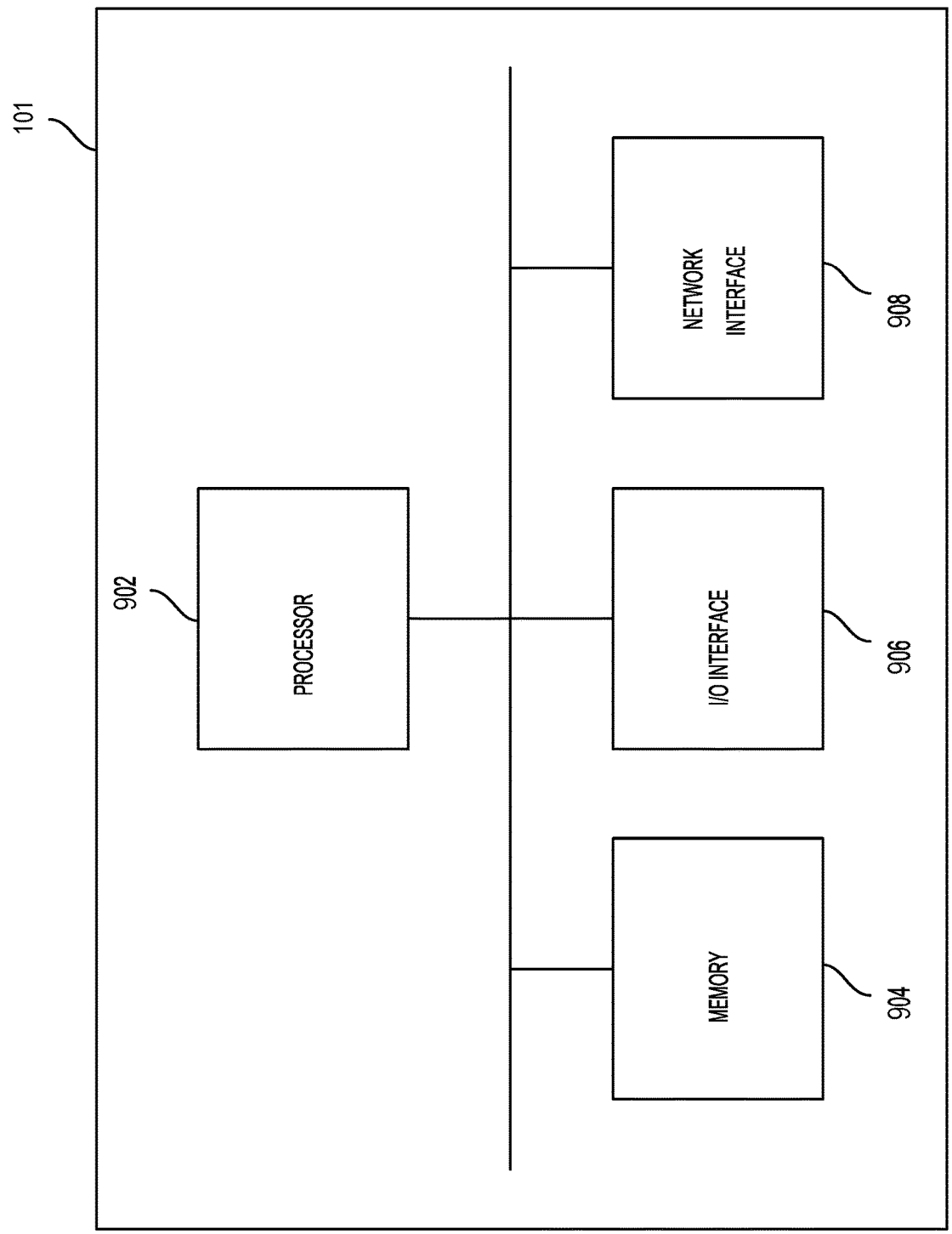
FIG. 9 is a component diagram of an example computing system according to example embodiments.

FIG. 9 is a schematic diagram of a computing device that can implement computing system 101, in accordance with an embodiment.

As depicted, computing device 101 includes at least one processor 902, memory 904, at least one I/O interface 906, and at least one network interface 908.

Each processor 902 may be, for example, any type of microprocessor or microcontroller (e.g., a special-purpose microprocessor or microcontroller), a digital signal processing (DSP) processor, an integrated circuit, a field programmable gate array (FPGA), a reconfigurable processor, a programmable read-only memory (PROM), or any combination thereof.

Memory 904 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

Each I/O interface 906 enables computing device 101 to interconnect with one or more input devices, such as a keyboard, mouse, camera, touch screen and a microphone, or with one or more output devices such as a display screen and a speaker.

Each network interface 908 enables computing device 101 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

For simplicity only, one computing device 101 is shown but system 100 may include multiple computing devices 101. The computing devices 101 may be the same or different types of devices. The computing devices 101 may be connected in various ways including directly coupled, indirectly coupled via a network, and distributed over a wide geographic area and connected via a network (which may be referred to as "cloud computing").

For example, and without limitation, a computing device 101 may be a server, network appliance, set-top box, embedded device, computer expansion module, personal computer, laptop, personal data assistant, cellular telephone, smartphone device, UMPC tablets, video display terminal, gaming console, or any other computing device capable of being configured to carry out the methods described herein.

In some embodiments, each of the image processor 104, the application 108, and the fusion processor 106 are a separate computing device 101. In some embodiments, the image processor 104, the application 108, and the fusion processor 106 are operated by a single computing device 101 having a separate integrated circuit for each of the said components. Various combinations of software and hardware implementation of the image processor 104, the application 108, and the fusion processor 106 are contemplated. In some embodiments, all or parts of image processor 104, the application 108, and the fusion processor 106 may be implemented using programming languages. In some embodiments, these components of system 100 may be in the form of one or more executable programs, scripts, routines, statically/dynamically linkable libraries, or the like.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory computer readable storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

Although the embodiments have been described in detail, it should be understood that various changes, substitutions and alterations can be made herein without departing from the scope as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

As can be understood, the examples described above and illustrated are intended to be exemplary only.

The invention claimed is:

1. A system for video-based tracking of objects or parts of the objects in one or more regions of interest, comprising:
a first image processor to:
receive a first captured 2D image stream of one or more regions of interest from a first camera, the 2D image stream depicting zero or more objects for tracking or detection;
generate a detection data set from the first captured 2D image stream, a terrain model of a reference environment model, and a first camera calibration, wherein the first camera calibration involves determining a position and orientation of the first camera with respect to the terrain model, the detection data set having one or more detection data entries of respective 2D imaging stream frame positions for detected objects or object parts in each frame of the first captured 2D image stream in the reference environment model, wherein the detection data entries comprise at least one 3D shape and position of the detected objects or object parts relative to the terrain model of the reference environment model determined using an intersection of a line of sight corresponding to a vertex of the detected objects or object parts with the terrain model of the reference environment model;
a second image processor to:
receive a second captured 2D image stream of one or more regions of interest from a second camera, the 2D image stream depicting the zero or more objects;
generate, in each frame of the second captured 2D image stream having the detected objects or object parts, one or more additional detection data entries from respective second 2D imaging stream frame positions, the terrain model, and a second camera calibration for the detected objects or object parts in the reference environment model, wherein the second camera calibration involves determining the position and orientation of the second camera with respect to the terrain model, wherein the detection data entries comprise at least one 3D shape and position of the detected objects or object parts relative to a terrain model of the reference environment model determined using an intersection of a line of sight corresponding to a vertex of the detected objects or object parts with the terrain model of the reference environment model;
a fusion processor to:
receive the detection data entries and the additional detection data entries; and
generate fused 3D referenced data by fitting the detection data entries and the additional detection data entries to a shape and a trajectory of the detected objects, wherein the trajectory is modelled as a continuous function over time and over a surface of the terrain model, wherein the 3D referenced fused data is data that indicates object shape and trajectory in the terrain model of the reference environment model;
transmit the fused 3D referenced data to an application; and
wherein the detected data entries include a detected shape in the terrain model of the reference environment model, and wherein the fitting considers a comparison of the detected shape and a test shape.

2. The system of claim 1, wherein the fitting considers an expected motion or an expected shape of each detected object.

3. The system of claim 1, wherein the first camera has a first field of view and the second camera has a second field of view, the first field of view and the second field of view having portions that do not overlap; wherein the trajectory has a first part in a first region of interest and a second part in a second region of interest.

4. The system of claim 1, wherein the first camera has a first field of view and the second camera has a second field of view, the first field of view and the second field of view having portions that overlap, wherein one or more of the detected objects are included in the first 2D imaging stream and the second 2D imaging stream.

5. The system of claim 1, further comprising an interface to render and display 3D visual overlays generated from the 3D referenced fused data.

6. The system of claim 1, wherein the fusion processor generates mobile radio routing data from the detection data set.

7. The system of claim 1, wherein test shapes are described by a set of parts, and the detected data entries include a vertex for each detected part in each frame.

8. The system of claim 1, wherein the trajectory is assigned by:
generating a test trajectory over a duration defined by trajectory parameters that define the continuous function based on a first detection data set at a first time and a second detection data set at a second time, wherein the first detection data set and the second detection data set are generated by the first image processor; and
adjusting the trajectory parameters to fit the test trajectory to an additional detection data set at a third time, wherein the third time occurs between the first and second time, wherein the additional detection data set is generated by the second image processor.

9. The system of claim 1, wherein the at least one 3D shape and position are determined using a footprint of the detected objects or object parts in the reference environment model determined using the intersection of the line of sight corresponding to the vertex of the detected objects or object parts.

10. A system for video-based tracking of objects or parts of objects in one or more regions of interest, comprising:

a camera capturing a 2D image stream of a region of interest, the 2D image stream depicting zero or more objects for tracking or detection;

an image processor to:

receive the captured 2D image stream from the camera;

generate a detection data set from the captured 2D image stream, a terrain model of a reference environment model, and a camera calibration, wherein the camera calibration involves determining a position and orientation of the camera with respect to the terrain model, the detection data set having one or more detection data entries of respective 2D imaging stream frame positions for detected objects or object parts in each frame of the captured 2D image stream in the reference environment model, wherein the detection data entries comprise at least one 3D shape and position of the detected objects or object parts relative to the terrain model of the reference environment model determined using an intersection of a line of sight corresponding to a vertex of the detected objects or object parts with the terrain model of the reference environment model;

a fusion processor configured to:

generate fused 3D referenced data by fitting the detection data entries to a shape and a trajectory of the detected objects in the terrain model of the reference environment model, wherein the trajectory is modelled as a continuous function over time and over a surface of the terrain model; and wherein the detected data entries include a detected shape in the terrain model of the reference environment model, and wherein the fitting considers a comparison of the detected shape and a test shape.

11. The system of claim 10, wherein the fusion processor generates the fused 3D referenced data by:

determining a most likely shape and trajectory among a set of test shapes and test trajectories for detection data entries within a time window;

selecting the most likely test trajectory of the set of test shapes and test trajectories as the trajectory; and selecting a most likely test shape of the set of test shapes and test trajectories as the shape.

12. The system of claim 11, wherein the test shapes and the most likely test shape is cuboid, and the detected data entries include 6 or more cuboid vertices for each detected object in each frame.

13. The system of claim 11, wherein the test shapes and most likely test shape is parameterized as a set of parts, and the detected data entries include one or more cuboid vertices for each detected object in each frame.

14. The system of claim 10, wherein the fusion processor generates mobile radio routing data from the detection data set.

15. The system of claim 10, wherein the fusion processor generates social distancing data by determining distances between two or more detected objects in the fused 3D referenced data.

16. The system of claim 10, wherein the detected objects are vehicles, and wherein the fusion processor generates traffic control data from the fused 3D referenced data representative of detected vehicle objects.

17. The system of claim 10, wherein the trajectory is assigned by:

generating a test trajectory over a duration defined by trajectory parameters that define the continuous function based on a first detection data set at a first time and a second detection data set at a second time, wherein the first detection data set and the second detection data set are generated by the image processor; and adjusting the trajectory parameters to fit the test trajectory to an additional detection data set at a third time, wherein the third time occurs between the first and second time, wherein the additional detection data set is generated by an additional image processor.

18. The system of claim 10, wherein the at least one 3D shape and position are determined using a footprint of the detected objects or object parts in the reference environment model determined using the intersection of the line of sight corresponding to the vertex of the detected objects or object parts.

19. A system for video-based tracking of objects or parts of objects in one or more regions of interest, comprising:

a camera capturing a 2D image stream of a region of interest, the 2D image stream depicting zero or more objects for tracking or detection;

an image processor to:

receive the captured 2D image stream from the camera;

generate a detection data set for the captured 2D image stream, a terrain model of a reference environment model, and a camera calibration, wherein the camera calibration involves determining a position and orientation of the camera with respect to the terrain model, the detection data set having one or more detection data entries of respective 2D imaging stream frame positions for detected objects or object parts in each frame of the captured 2D image stream in the reference environment model, wherein the detection data entries comprise at least one 3D shape and position of the detected objects or object parts relative to the terrain model of the reference environment model determined using an intersection of a line of sight corresponding to a vertex of the detected objects or object parts with the terrain model of the reference environment model;

a fusion processor configured to:

generate fused 3D referenced data by fitting the detection data entries to a shape and a trajectory of the detected objects in the terrain model of the reference environment model, wherein the trajectory is modelled as a continuous function over time and over a surface of the terrain model;

wherein the fusion processor determines the most likely shape and trajectory among the set of test shapes and test trajectories by assigning a likelihood to test trajectories and test shapes, wherein the likelihood is inversely related to acceleration.

20. The system of claim 19, wherein the fusion processor generates the fused 3D referenced data by:

determining a most likely shape and trajectory among a set of test shapes and test trajectories for detection data entries within a time window;

selecting the most likely test trajectory of the set of test shapes and test trajectories as the trajectory; and selecting a most likely test shape of the set of test shapes and test trajectories as the shape.

21. The system of claim 20, wherein the test shapes and the most likely test shape is cuboid, and the detected data entries include 6 or more cuboid vertices for each detected object in each frame.

22. The system of claim 20, wherein the test shapes and most likely test shape is parameterized as a set of parts, and the detected data entries include one or more cuboid vertices for each detected object in each frame.

23. The system of claim 19, wherein the fusion processor generates mobile radio routing data from the detection data set.

24. The system of claim 19, wherein the fusion processor generates social distancing data by determining distances between two or more detected objects in the fused 3D referenced data.

25. The system of claim 19, wherein the detected objects are vehicles, and wherein the fusion processor generates traffic control data from the fused 3D referenced data representative of detected vehicle objects.

26. The system of claim 19, wherein the likelihood of the test trajectory is assigned in part by:
- generating the test trajectory over a duration defined by trajectory parameters that define the continuous function based on a first detection data set at a first time and a second detection data set at a second time, wherein the first detection data set and the second detection data set are generated by the image processor; and
- adjusting the trajectory parameters to fit an additional detection data set at a third time, wherein the third time occurs between the first and second time, wherein the additional detection data set is generated by an additional image processor.

27. The system of claim 19, wherein the at least one 3D shape and position are determined using a footprint of the detected objects or object parts in the reference environment model determined using the intersection of the line of sight corresponding to the vertex of the detected objects or object parts.

* * * * *